(12) United States Patent
Hsieh

(10) Patent No.: US 6,821,155 B2
(45) Date of Patent: Nov. 23, 2004

(54) CARD SWITCH DEVICE

(75) Inventor: Hsiang-An Hsieh, Hsin-Dian (TW)

(73) Assignee: Carry Computer Eng. Co., Ltd, Hsin Tien Taipei (TW)

( * ) Notice: Subject to any disclaimer, the term of this patent is extended or adjusted under 35 U.S.C. 154(b) by 0 days.

(21) Appl. No.: 10/350,114

(22) Filed: Jan. 24, 2003

(65) Prior Publication Data

US 2004/0106326 A1 Jun. 3, 2004

(30) Foreign Application Priority Data

Nov. 28, 2002 (TW) ...................................... 91219243 U

(51) Int. Cl.⁷ .............................................. H01R 24/00
(52) U.S. Cl. ........................ 439/630; 439/945; 361/737
(58) Field of Search ................................ 439/630, 945, 439/946; 361/737, 735

(56) References Cited

U.S. PATENT DOCUMENTS

| | | | | |
|---|---|---|---|---|
| 6,010,066 A | * | 1/2000 | Itou et al. | 235/379 |
| 6,097,605 A | * | 8/2000 | Klatt et al. | 361/737 |
| 6,250,965 B1 | * | 6/2001 | Neifer | 439/630 |
| 6,352,445 B2 | * | 3/2002 | Takei et al. | 439/489 |
| 6,386,920 B1 | * | 5/2002 | Sun | 439/630 |
| 6,482,029 B2 | * | 11/2002 | Nishimura | 439/541.5 |
| 6,607,405 B2 | * | 8/2003 | Nishimura | 439/630 |
| 2004/0033722 A1 | * | 2/2004 | Liu et al. | 439/630 |

* cited by examiner

*Primary Examiner*—Tho D. Ta
(74) *Attorney, Agent, or Firm*—Thomas, Kayden, Horstemeyer & Risley

(57) ABSTRACT

A card switch device comprises a base plate and a base frame at least, and the base plate is electrically connected to a socket on the side thereof. The base frame has a groove retaining contact elements of memory cards of not less than two standards. Thus, the card switch device can provide use for one or more memory cards.

10 Claims, 5 Drawing Sheets

CARD SWITCH DEVICE

BACKGROUND OF THE INVENTION

1. Field of the Invention

The present invention relates to a card switch device, particularly to a switch device supporting memory cards of different standards.

2. Description of the Prior Art

With the progress of IT, storage medias based on semiconductor technology are gradually replacing the conventional floppy disks, compact disc (CD), and becoming new and developing storage medias which are also called memory cards. And they have been widely used in the digital products with the corresponding sockets, for example, Notebook, PDA, e-Book, DSC, MP3, etc. Compared with said conventional storage medias, they are better in portability, power consumption, data preservation, datatransmission rate, reread-write, shockproof and moistureproof features. However, the memory cards are legion on the market, such as Compact Flash (CF) card, Secure Digital (SD) card, MultiMedia card (MMC), Memory Stick Duo (MS Duo) card, etc. Therein, the CF card published in 1994 is the most popular, and its standard has been embedded in a great variety of digital products. In this case, only CF Card can be used in digital products, that is to say, other kinds of cards can't be used. Thus, manufacturers have studied a CF card interface switch so that other memory cards can be used in the products with embedded the CF card standard. The interface switch has CF standard and can switch and support single standard card (e.g. SD card or MMC card).

However, the CF card interface switch can not support a new memory card standard-xD memory card (xD picture card) published by OLYMPUS and Fujifilm together in July, 2002 (xD memory card was evolved from Smart Media (SM) card with a smaller size (20.0 mm×25.0 mm), and it is uneasy to be broken and has high capacity).

Furthermore, the read-write devices or the switch devices that have gained currency for a long time on the market can only be used for existing standard memory cards and can not compact with the recent xD card. Accordingly, memory cards can be used only in user side or product side of read-write devices or the switch devices according to xD memory card standard, and it is inconvenient and troublesome in use. But it is uneconomical if a single socket for the new standard is made specially.

SUMMARY OF THE INVENTION

To solve said problems and attain other efficacies and objects, the inventor, an expert in reading card device, invented a "card switch device" after continuous study and test.

The main object of the present invention is to provide a card switch device to allow one or more cards to insert. The card switch device includes a base frame and a base plate. The base frame has a groove to hold a plurality of cards by means of spatial overlap, and at least a first row of contact elements and a second row of contact elements are arranged on a bottom of the base frame. A socket is arranged at one side of the base plate and it is electrically connected to the base frame. When the memory cards are inserted in the groove at different times, the first or second row of contact elements will couple with the signals from the memory cards and will transform them into the format conformal to the card switch device.

Another object of the present invention is to provide a third row contact elements/pins to support SD/MMC card, and/or MS Duo card and/or xD card or other small memory cards. Therein, according to the present invention, pins of MS Duo and SD/MMC can further be arranged to be commonly-used, thus the same efficacy is obtained and the cost is reduced.

Detailed structure and effect of the present invention will become apparent according to the attached drawings and the preferred embodiment.

Figure 1:
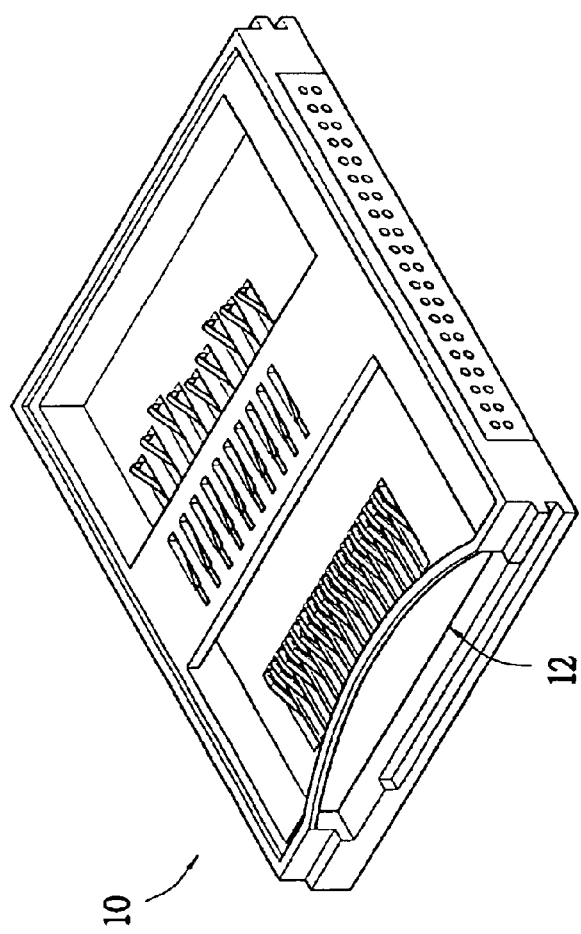
FIG. 1 is the 3D view of a card switch device of the present invention.

Card switch device (10)
Groove (12)
Top shell (14)
Bottom shell (16)
Socket (18)
First row contact elements (20)
Second row contact elements (21)
Third row contact elements (22)
Base frame (24)
Base plate (26)
Memory card (30)

DETAILED DESCRIPTION OF THE PREFERRED EMBODIMENTS

Referring to FIG. 1, it is the 3D view of a card switch device of the present invention, in FIG.1, there is a standard CF (Compact Flash) card. CF cards can be classified into two types: Type I (3.3 mm)/Type II (5.0 mm) according to thickness.

Figure 2:
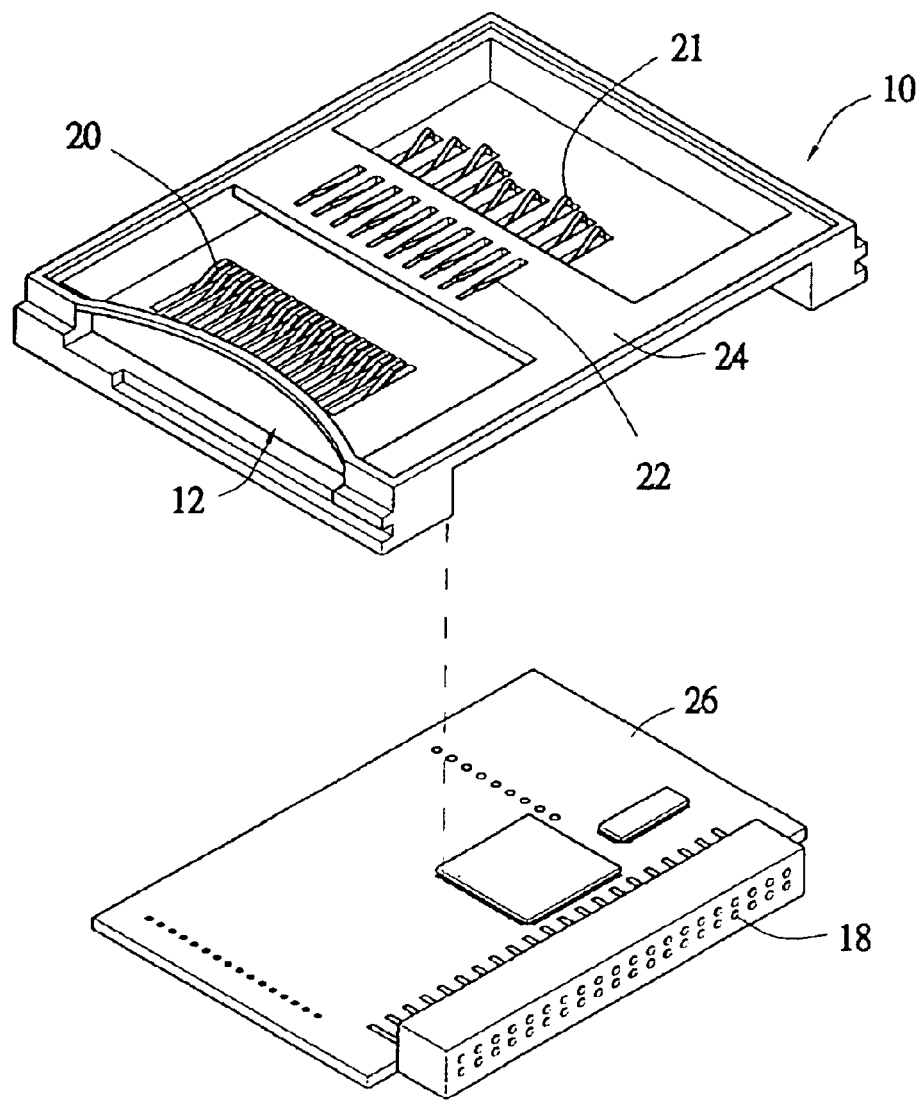
FIG. 2 is the first exploded view of a card switch device of the present invention.
Figure 3:
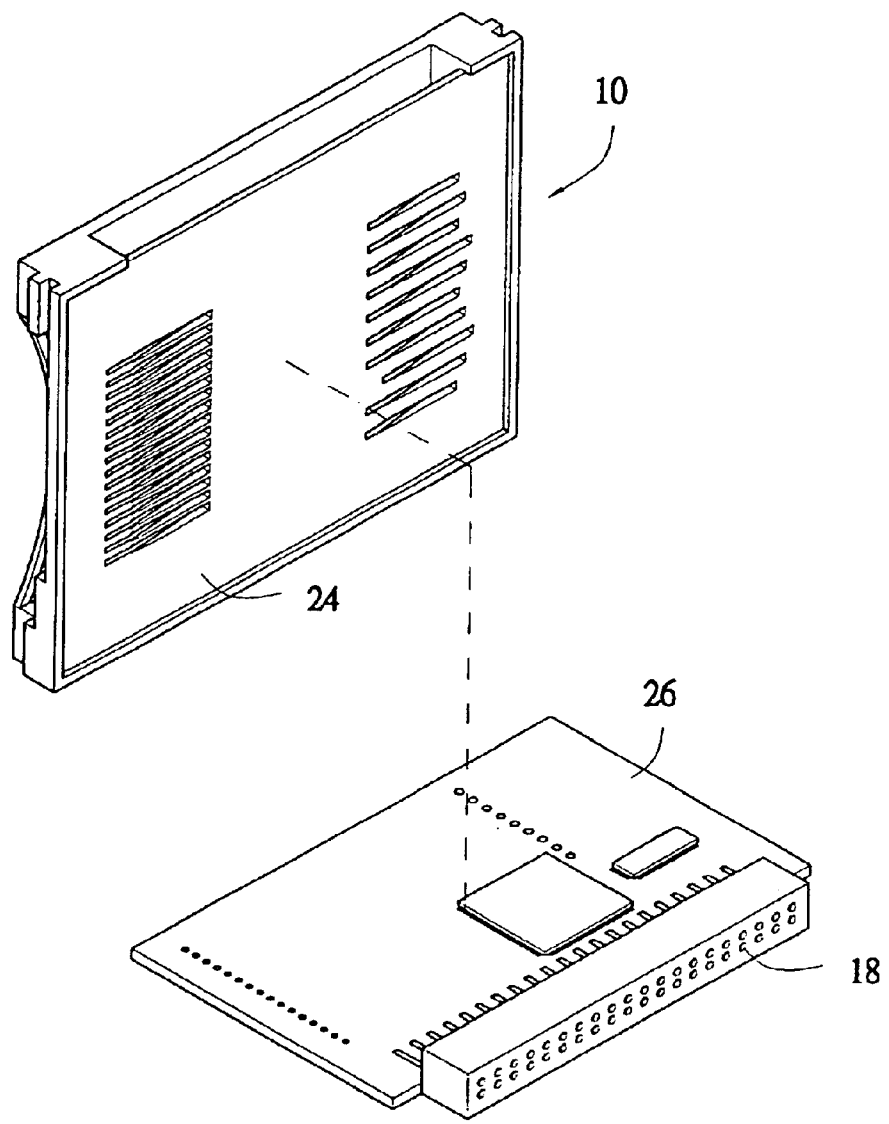
FIG. 3 is the second exploded view of a card switch device of the present invention.

Also as shown in FIGS. 2–3, they are the exploded views of a card switch device of the present invention. The card switch device (10) of the present invention can switch one or more memory cards, i.e., the signals from the memory cards will be transformed into the format conformal to the CF card interface to transmit. In a preferred detailed embodiment, the card switch device includes a base frame and a base plate.

A base frame (24) has a groove (12), which contains the memory cards arranged in overlap. A first row of contact elements (20), a second row of contact elements (21) and third row of contact elements (22) are properly distributed over the groove (12). The contact elements are, for example, pins.

A base plate (26), is placed under the base frame (24). A socket is formed at one side of the base plate (26) and electrically connected to the base frame (24). A plurality of round holes connected with the contact elements are arranged at the position corresponding to the contact elements on the base plate. When a small memory card is inserted in the groove (12), the corresponding contact elements will couple with the signals form the memory card and transform the signal into the format conformal to the card switch device (10) via appointed contact elements among these contact elements.

In the preferred embodiment, a first and a second row of contact elements (20), (21) are arranged back and forth at one side of the groove (12). And the first row of contact elements (20) has 16 pins to couple with an xD card, and the second row of contact elements (21) has 9 pins to couple with an SD card or an MMC card. However, the third row of contact elements (22, 10 pins) are arranged at the other side of the groove (12), where the MS DUO card can be inserted for coupling with each other. Thus, it makes the groove (12) supporting different types of memory cards (including xD, MS Duo, SD and MMC cards or other small memory cards). Particularly, the contact elements (20), (21) and (22) are embedded in the groove (12) of the base frame (24) by pin loading. The contact elements are connected to the round holes of the base plate (26) by SMT or DIP.

Figure 4:
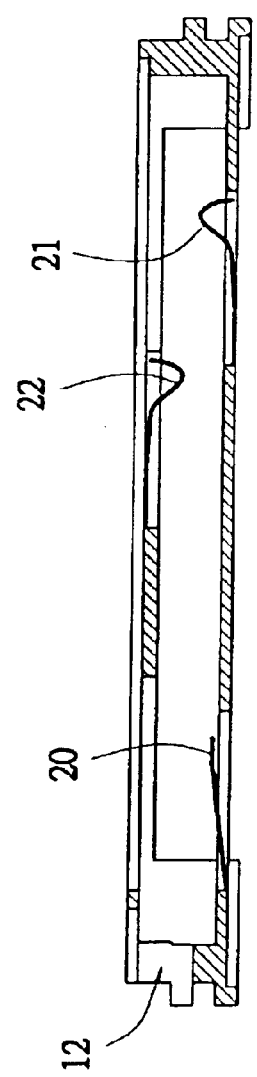
FIG. 4 is the side view of a card switch device of the present invention.

As shown in FIG. 4, it is the side view of a card switch device of the present invention. It's obvious that the three rows of contact elements (20)~(22) are arranged at their corresponding position and are arranged according to the sizes of the memory cards. Thus, such a design will not cause increased thickness of the standard card switch device (10) of the present invention for supporting insertion of different types of memory cards. In other words, this technology agrees with not only the standard CF type I, type II cards but also the lengthened CF cards.

It should be supplemented that in the combination of the base frame (24) and the base plate (26), besides certain circuit configuration on the base plate (26), there are also IC, memory cards, capacitance, and resistance, etc. And according to the position of the contact elements (20), (21), pluralities of small round holes are arranged on the base plate (26) in order to implement better combination. The third row of contact elements (22) are combined with the base plate (26) through the pins extending upwards from the base frame (24) for signal transmission. This is the prior art and it is not discussed here.

Figure 5:
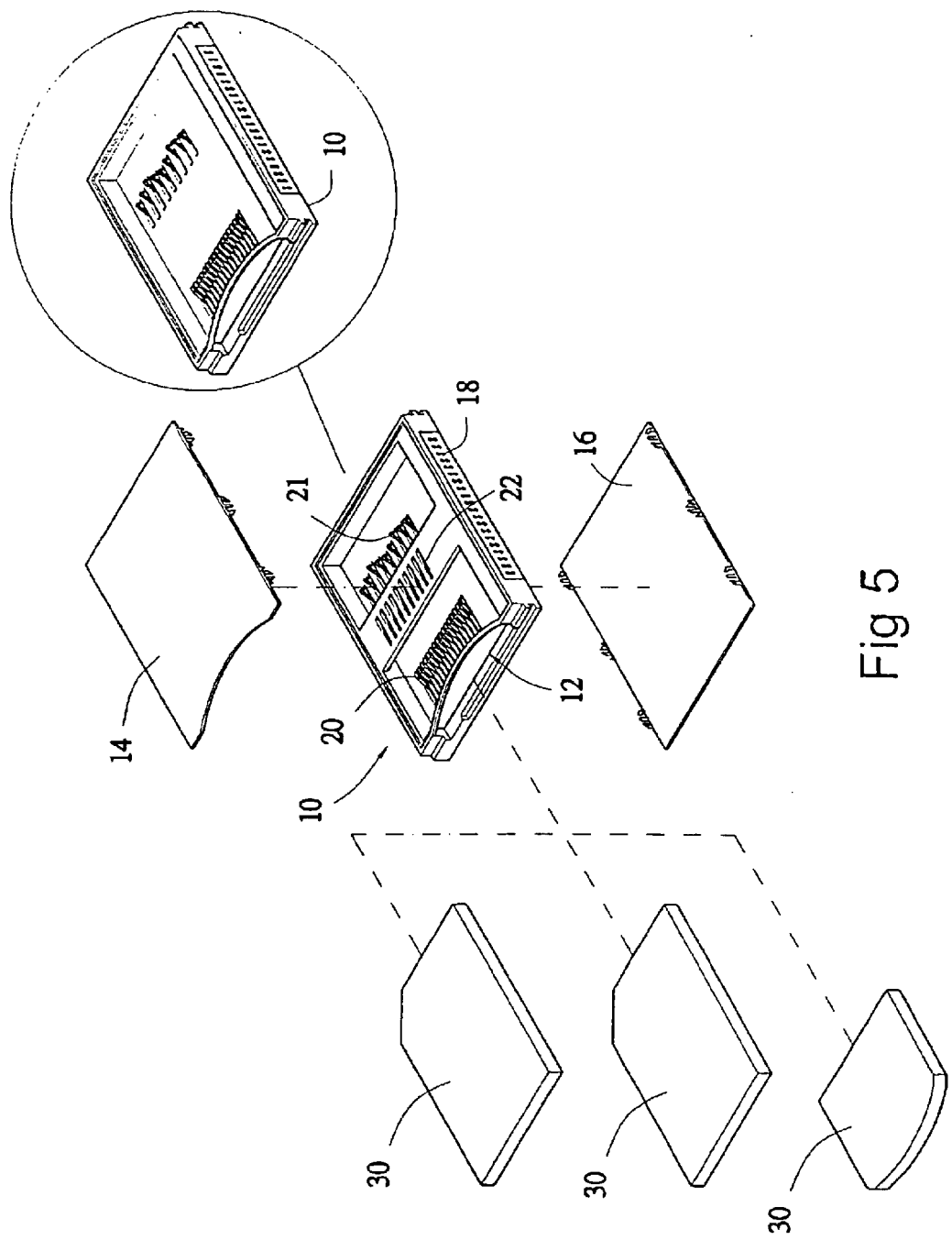
FIG. 5 is the diagram of an embodiment of a card switch device supporting insertion of different types of memory cards according to the present invention.

Also as shown in FIG. 5, it is the diagram of an embodiment of a card switch device supporting insertion of different types of memory cards according to the present invention. In FIG. 5. The base frame (24) of the present invention further comprises a top shell (14) and a bottom shell (16) for covering the card switch device (10).

Obviously, besides the third row of contact elements (22), another row of pins (as marked with circle in FIG. 5) are arranged around the second row of contact elements, because the exterior size of the SD/MMC card is similar to the MS Duo card in size.

In conclusion, the card switch device of the present invention has at least the following advantages and efficacy:

1. The switch device of the CF card interface according to the present invention can support insertion and access of different types of standard memory cards which are inserted at different times through a single groove.

2. According to the present invention, the single groove is arranged to hold the different types of memory cards by special overlap. The memory cards comprise: MS Duo card, SD/MMC card and xD card or other small memory cards.

3. According to the present invention, besides the third row of contact elements, the contact elements for SD/MMC cards can be commonly used for MS Duo cards.

What is claimed is:

1. A card switch device, at least comprising:
    a base frame having a top and a bottom to define a groove therebetween, wherein
        a first group of contact elements is distributed over the top with a portion of each of the first group of contact elements penetrating in the groove through the top of base frame for electrical connection to a first kind of memory card; and
        a second group of contact elements is distributed over the bottom with a portion of each of the second group of contact elements penetrating in the groove through the bottom of the base frame for electrical connection to at least two types of memory cards that are different types from the first type of memory cards; and
    a base plate, located under the base frame and having a socket at one side of the base plate, the socket being plate electrically connected to the base frame.

2. The card switch device of claim 1, wherein the base frame further includes a top shell and a bottom shell.

3. The card switch device of claim 1, wherein the card switch device is used for standard type I/type II CF (compact flash) cards and lengthened CF cards.

4. The card switch device of claim 1, wherein the card switch device is used for the PCMCIA (Personal Computer Memory Card International Association).

5. The card switch device of claim 1, wherein the second group of contact elements are used to couple with an MS (memory stick) Duo card independently.

6. The card switch device of claim 1, wherein all the contact elements are connected to the base plate by SMT (surface mount technology) or DIP (dual in-line) method.

7. The card switch device of claim 1, wherein the second group of contact elements at least comprises a first row of contact elements and a second row of contact elements respectively at a front portion and a rear portion of the bottom of the base frame.

8. The card switch device of claim 7, wherein the first row of contact elements are used to couple with an xD card.

9. The card switch device of claim 7, wherein the second row of contact elements are used to couple with an SD (secure digital) card and/or an MMC (multimedium card) card.

10. The card switch device of claim 7, wherein the second row of contact elements is used to couple with an SD card, an MMC card and an MS card.

* * * * *